United States Patent [19]

Clark

[11] 4,314,233

[45] Feb. 2, 1982

[54] FOUR-WIRE SPEED INDEPENDENT ARBITER SWITCH FOR DIGITAL COMMUNICATION NETWORKS

[75] Inventor: Becky J. Clark, Tualatin, Oreg.

[73] Assignee: Burroughs Corporation, Detroit, Mich.

[21] Appl. No.: 104,964

[22] Filed: Dec. 18, 1979

[51] Int. Cl.³ .................. H04Q 9/00; H04J 6/00
[52] U.S. Cl. .................. 340/825.02; 340/825.03;
179/18 FG; 370/60; 370/94; 307/244
[58] Field of Search .......... 340/147 C, 166 R, 147 T,
340/147 LP; 179/18 AG, 18 AF, 18 AH, 15 A,
18 FD, 18 FG; 370/60, 94, 85, 91-93; 307/244,
232, 241, 208

[56] References Cited

U.S. PATENT DOCUMENTS

| | | | |
|---|---|---|---|
| 3,633,163 | 1/1972 | Birchmeier | 340/166 R |
| 3,678,205 | 7/1972 | Cohen et al. | 340/166 R |
| 3,909,786 | 9/1975 | Lawrence | 340/147 R |

*Primary Examiner*—John W. Caldwell, Sr.
*Assistant Examiner*—Donnie L. Crosland
*Attorney, Agent, or Firm*—Mervyn L. Young; Kevin R. Peterson

[57] ABSTRACT

A speed independent selection switch designed for pipelined message transmission through digital communication networks. The selector routes a message from the input path to one of the two output paths selected by the first bit of the message, that bit then being discarded. Communication paths require four wires.

7 Claims, 12 Drawing Figures

FIG. 1
COMMUNICATION PATH
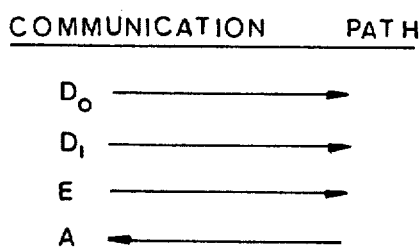
FIG. 2
FOUR-PHASE CYCLE
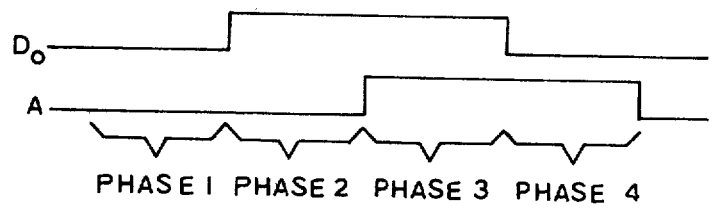
PHASE 1  PHASE 2  PHASE 3  PHASE 4
FIG. 3
TRANSMISSION FORMAT
SENT: D • • • D D • • • D E E
      _____/ _____/
       DESTINATION  MESSAGE
       ADDRESS
RECEIVED:     D • • • D E D • • • D E
              _____/ _____/
                MESSAGE      RETURN
                             ADDRESS

FIG. 6
REQUEST CIRCUIT
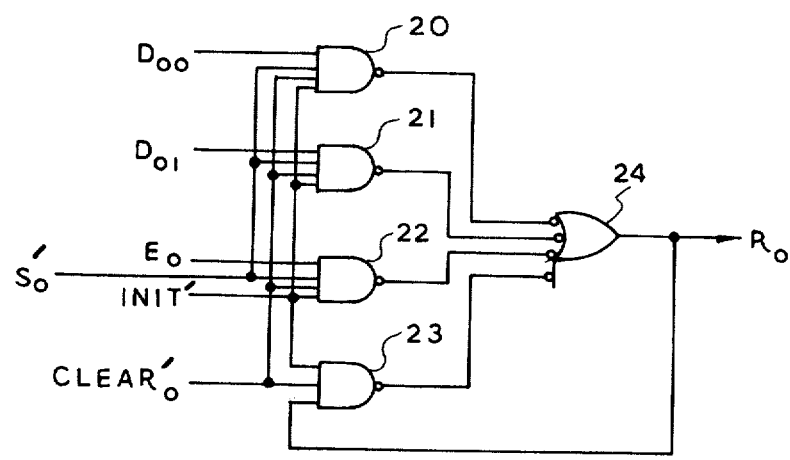
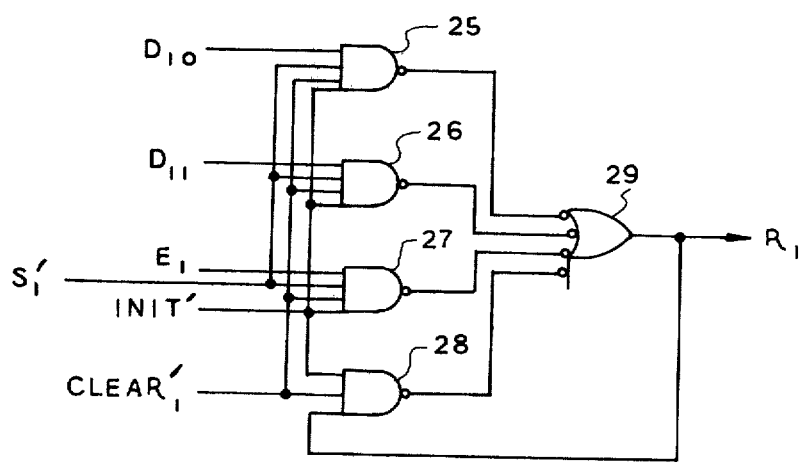

FIG. 10 QUEUE, E PATH

FOUR-WIRE SPEED INDEPENDENT ARBITER SWITCH FOR DIGITAL COMMUNICATION NETWORKS

RELATED U.S. PATENT APPLICATIONS

U.S. patent applications directly or indirectly related to the subject application are the following:

Ser. No. 035,314 filed May 2, 1979 by Robert Stanley Barton and Becky Jane Clark and titled Digital Communication Networks Employing Speed Independent Switches;

Ser. No. 035,315 filed May 2, 1979, now U.S. Pat. No. 4,251,879, by Becky Jane Clark and titled Speed Independent Arbiter Switch for Digital Communication Networks;

Ser. No. 035,411 filed May 2, 1979, now U.S. Pat. No. 4,237,447, by Becky Jane Clark and titled Speed Independent Selector Switch for Digital Communication Networks; and Ser. No. 104,965 filed Dec. 18, 1979 by Becky Jane Clark and titled Four-Wire Speed Independent Selector Switch for Digital Communication Networks.

BACKGROUND OF THE INVENTION

FIELD OF THE INVENTION

This invention pertains to networks of digital devices with shared components, which networks in turn may share components at a higher level. The interconnections are constructed from two kinds of speed independent switches called arbiters and selectors.

Communication in networks connected by arbiter and selector switches is in the form of serially transmitted messages which in the general case consist of three parts: destination address, body, and source address. The source address originates on the path where it is determined by the arbiter switches from the destination to the source. The destination address selects the path through the network to the destination and is used bit-by-bit in the selector switches along that path. In general, as a message moves through a network, an arbiter appends a bit to indicate through which of its two inputs a message entered and a selector removes the leading bit and selects through which of its two outputs the message leaves. A receiving device accepts first the message body and then the source address.

A speed independent arbiter switch has been described in the above referred-to Clark patent application Ser. No. 035,315, and networks in which it may be employed have been described in the above referred-to Barton et al patent application Ser. No. 035,314. The arbiter described in the present application constitutes an improvement over that described in Ser. No. 035,315.

It is an object of the present invention to provide an improved speed independent arbitration switch for digital communication networks requiring fewer wires per communication path.

It is another object of the present invention to provide an arbiter switch with a simpler communication protocol.

It is another object of the present invention to provide an arbiter switch which allows clearing of a communication path from the sender towards the receiver as soon as the message has traversed the switch.

It is another object of the present invention to provide an arbiter switch through which empty messages may be sent.

SUMMARY OF THE INVENTION

The present invention is a speed independent arbitration switch designed for pipelined message transmission through digital communication networks. The arbiter routes a message from one of two input paths to the output path and appends a bit to the message indicating the input path. When requests are present on both input paths, the arbiter accepts messages from them alternately, choosing the first randomly if the requests arrive simultaneously.

The communication paths each use four wires, three of which are used in a 1-out-of-3 code and the fourth of which acknowledges receipt of a character.

Trees formed from arbiters provide arbitration for two or more devices requesting the use of a shared device.

Networks employing both arbiters and selectors can be formed for the transmission of messages among a number of devices.

BRIEF DESCRIPTION OF THE DRAWINGS

The above and other objects, advantages and features of the present invention will become more readily apparent from a review of the following specifications when taken in conjunction with the drawings, wherein:

FIG. 1 is a diagram of a communication path;

FIG. 2 is a timing diagram of a four-phase cycle;

FIG. 3 is a diagram of transmission format;

FIGS. 6–12 are schematic diagrams of the arbiter switch.

GENERAL DESCRIPTION OF THE INVENTION

Figure 4:
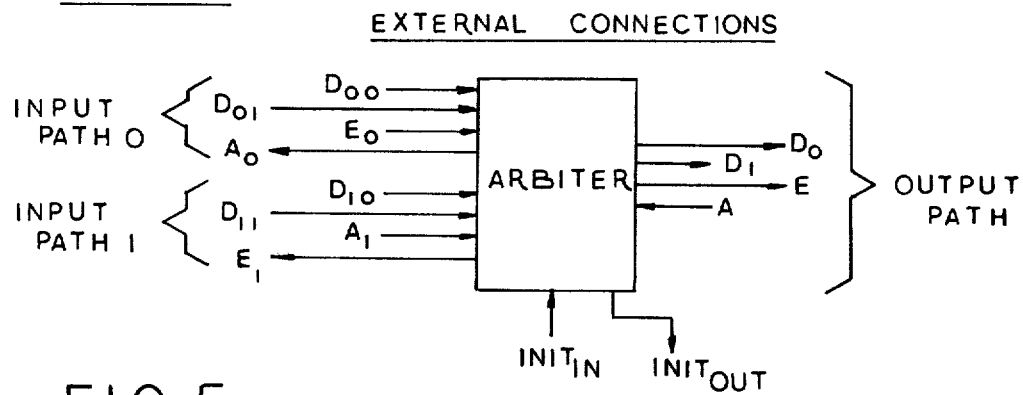
FIG. 4 is a diagram of an arbiter switch.

The arbiter of the present invention is used together with the selector of the above referred-to Clark patent application Serial Number in the networks of the above referred-to Barton et al patent application Ser. No. 035,314. The communication paths of both the selector and arbiter require four wires for each path as shown in FIG. 1. Three of the lines, $D_0$, $D_1$, and E, are used in a 1-out-of-3 code, and a one on any of these lines is referred to as a character. At any given time, either all three will be in the dormant or zero state or exactly one will be in the active or one state. The fourth line A is used in a four-phase cycle with each of the first three lines individually to indicate that the data sent on $D_0$, $D_1$, or E has been received or cleared. The four phases of the cycle are shown in FIG. 2 with $D_0$ and A. In the first or dormant phase, all four lines are zero. When A is zero, one of the other three lines may change to one. In the second phase, $D_0$ has changed to one indicating that a zero is being sent. A will then change to one initiating the third phase and indicating that the data has been received and the sender may clear $D_0$. In the fourth phase, $D_0$ has returned to zero, and when A returns to zero, the first or dormant phase is entered again.

$D_0$ and $D_1$ are used to send message and address bits with zeroes transmitted on $D_0$ and ones on $D_1$, and E is used to terminate the message and the return address. The format for a transmission is some number (possibly zero) of zeroes and ones constituting the address through selectors of the network and the message followed by E terminating the message followed by some number (possibly zero) of zeroes and ones constituting the return address followed by E terminating the return address and the transmission. The first character of a transmission traversing a selector must be a zero or a one and will be removed and used to set the output path of the selector. A transmission traversing an arbiter will have a return address character inserted after the first E indicating the input path in use for the transmission. The characters of the return address will be received in the order required to send a return transmission.

An empty message may be sent through a network of arbiters, and an empty return address may be received from a network of selectors. Upon input to a network, a transmission will normally consist of the destination address (if any), the message, and two Es (since the return address will be generated by the network). The transmission received from a network will normally consist of the message, E, the return address (if any), and E. These formats are shown in FIG. 3.

The second E of a transmission will cause a switch to clear. In the case of the selector, this means that the next bit received on the input will select the output path for the following transmission. In the case of the arbiter, the next transmission to arrive at one of the inputs will be allowed through. Whenever a transmission through one input clears, a message waiting on the other input will be allowed through. Thus, under heavy loading conditions, the arbiter will alternate between the two input paths.

DESCRIPTION OF THE ARBITER SWITCH

The arbiter switch is shown in FIGS. 4-12. FIG. 4 shows the external connections. The input path indicated by a zero in the return address consists of inputs $D_{00}$, $D_{01}$, and $E_0$ and output $A_0$. The input path indicated by a one in the return address consists of inputs $D_{10}$, $D_{11}$, and $E_1$ and output $A_1$. The output path consists of outputs $D_0$, $D_1$, and E and input A. In addition to the communication paths, there is an initialization signal $Init_{in}$ which resets the arbiter to the initial state and is used when power to the circuits is turned on. $Init_{in}$ is buffered to produce $Init_{out}$ for cascading of switches.

Figure 5:
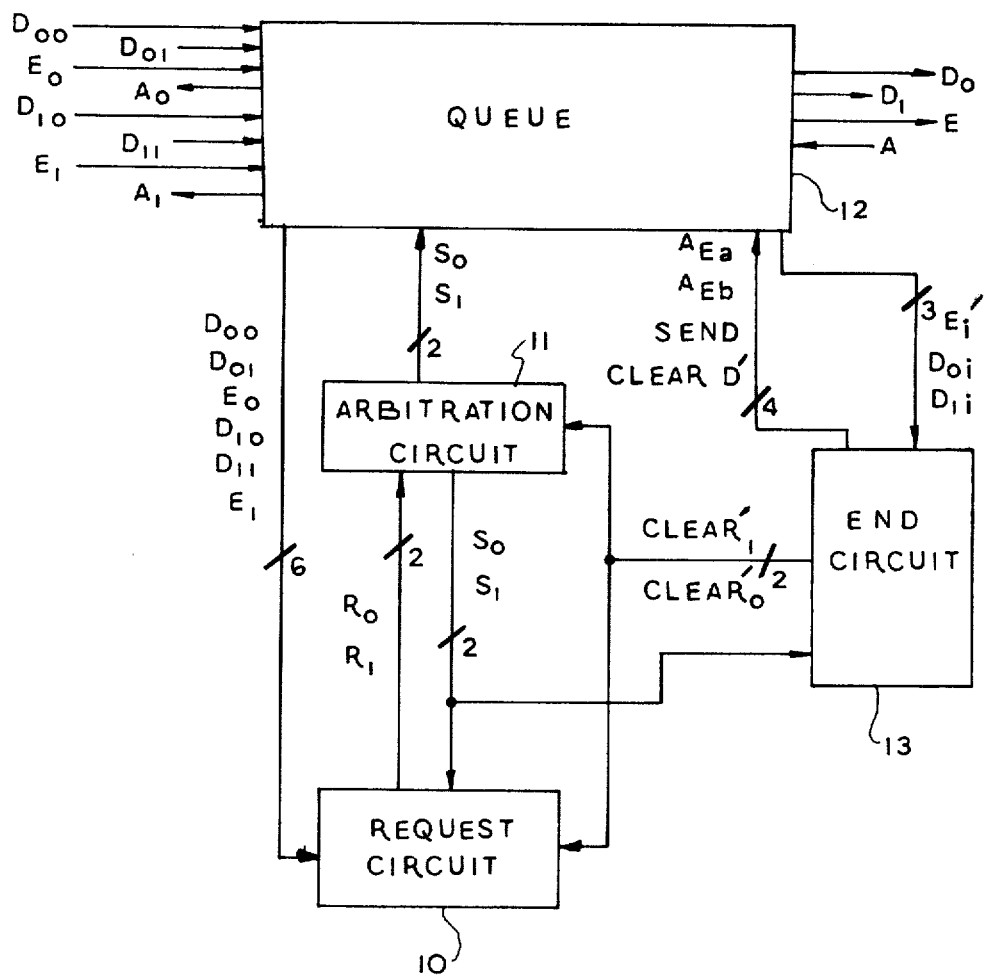
FIG. 5 is a block diagram of the parts of an arbiter switch.

The block diagram for the arbiter is shown in FIG. 5. Request circuit 10 detects the first character of a transmission on either input path and generates the requests to the arbitration circuit for control of the arbiter. Arbitration circuit 11 resolves any conflict between requests from the two input paths and sets the appropriate path through the arbiter. Queue 12 is a one-character queue used for pipelining the signals received from the set input path to the output path. End circuit 13 detects the first E of a transmission sending a signal on $D_0$ or $D_1$ according to the setting of the input path and detects the second E of a transmission causing clearing of the arbiter switch.

Request circuit 10 of FIG. 5 is shown in detail in FIG. 6. A number of groups of gates in the arbiter may be viewed as implementations of the concensus or C-element or variations of a C-element which have similar timing characteristics. In FIG. 6, the two similar circuits consisting of gates 20-24 and gates 25-29 are such variations. When the arbiter is not set to the zero path, $Clear_0'$ and $S_0'$ will both be one. When $D_{00}$, $D_{01}$, or $E_0$ changes to one, gate 20, 21, or 22, respectively, will change to zero causing $R_0$ to change to one indicating a request to the arbitration circuit. When the request has been satisfied by the arbitration circuit, $S_0'$ will change to zero, inhibiting further signals on $D_{00}$, $D_{01}$, or $E_0$. After the transmission has been completed, $Clear_0'$ will change to zero causing $R_0$ to change to zero to remove the request to the arbitration circuit. When $Clear_0'$ has returned to one, the next signal on $D_{00}$, $D_{01}$, or $E_0$ will cause the cycle to be repeated by generating a new request on $R_0$. Operation of gates 25-29 is analogous to operation of gates 20-24 just described.

Figure 7:
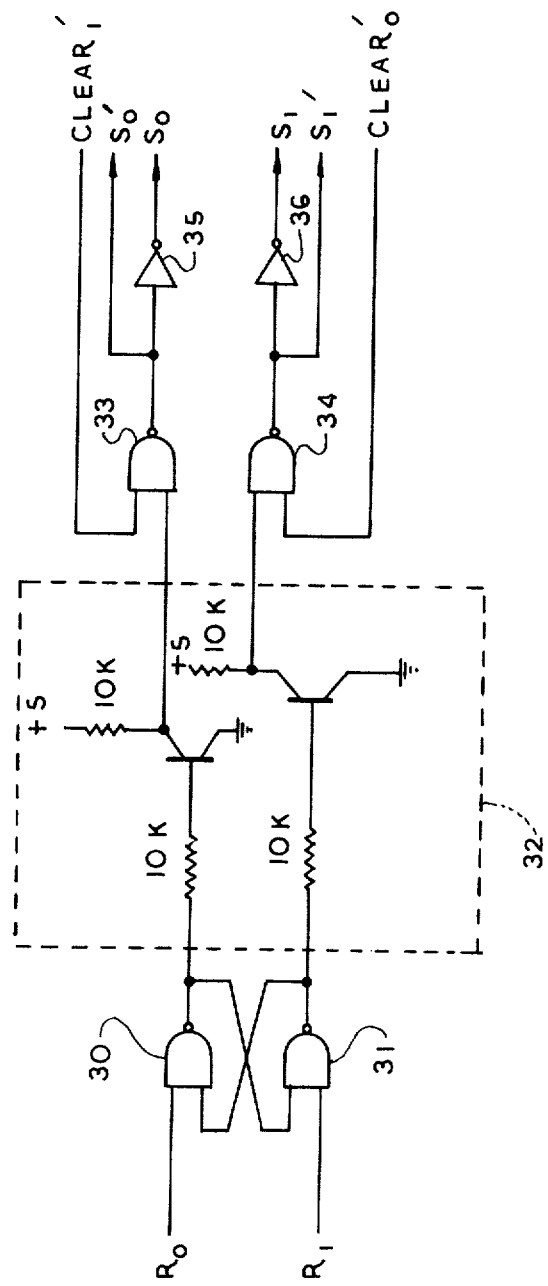

The arbitration circuit 11 of FIG. 5 is shown in detail in FIG. 7. When no request is present on either input path, $R_0$ and $R_1$ will both be zero, and both outputs of the latch composed of gates 30 and 31 will be one. If $R_0$ changes to one, gate 30 will change to zero and block any request on $R_1$. Similarly, if $R_1$ changes to one, gate 31 will change to zero and block any request on $R_0$. If both $R_0$ and $R_1$ change to one simultaneously, the possibility of metastable signals on the outputs of gates 30 and 31 arises. Metastability circuit 32 is necessary to prevent any metastable signals from propagating. The metastability circuit shown is for the TTL circuit family; circuits are known for other circuit families. When the latch has settled with a zero on the output of gate 30 or 31, gate 33 or 34 will change to zero and gate 35 or 36 to one, respectively, setting the path through the arbiter to the zero path with a one on $S_0$ or to the one path with a one on $S_1$. When the transmission has been completed, if $S_0$ is one, $Clear_0'$ will change to zero blocking requests on the one path while $R_0$ changes to zero removing the request on the zero path and causing $S_0$ to return to zero. When $Clear_0'$ returns to one, a request on the one path will be allowed through. If no request is present on the one path, the next request on either path will obtain control of the arbiter. Operation upon completion of a transmission with $S_1$ set to one is analogous to that for $S_0$ set to one just described.

Figure 8:
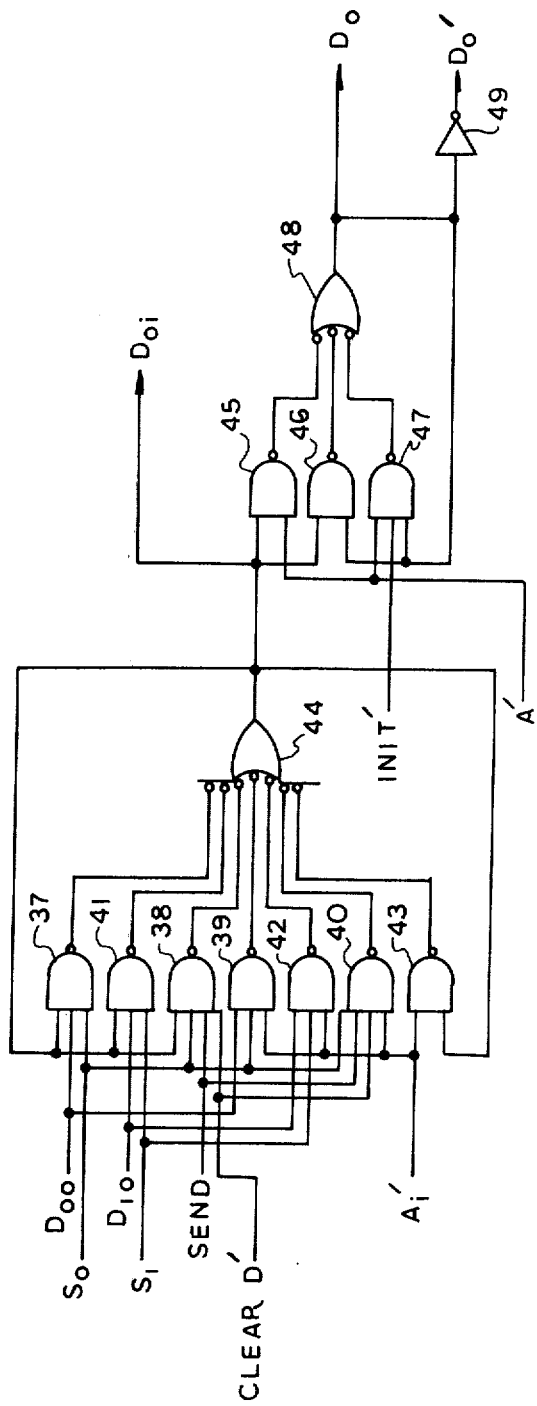

Queue circuit 12 of FIG. 5 is shown in detail in FIGS. 8-11. FIG. 8 shows the zero circuit of the one-character queue. C-element 37-44 is part of the input cell, and C-element 45-48 is part of the output cell. When the arbiter is clear, $S_0$, $S_1$, and Send will be zero, and $A_i'$ will be one. When a request arrives on one of the input paths, $S_0$ or $S_1$ will change to one enabling either gates 37-40 or gates 41-42 for the entire transmission. If $A_i'$ and $S_0$ are one, a one on $D_{00}$ will cause $D_{0i}$ to change to one filling the input cell of the queue. If A' is one indicating that output data may be accepted, $D_0$ will then change to one and $D_0'$ to zero causing $A_i'$ to change to zero. When $A_i'$ is zero and $D_{00}$ has returned to zero, $D_{0i}$ will change to zero emptying the input cell. When the input cell is empty and A' has changed to zero, $D_0$ will change to zero emptying the output cell. Operation is analogous for $S_1$ set to one. After the first E of the transmission is received, if $S_0$ is one, a zero character will be inserted by means of gates 38 and 40. Send will change to one causing a one on $D_{0i}$ when $A_i'$ is one. When $D_{0i}$ is one, Clear D' will change to zero on $D_{0i}$ when $A_i'$ is zero.

Figure 9:
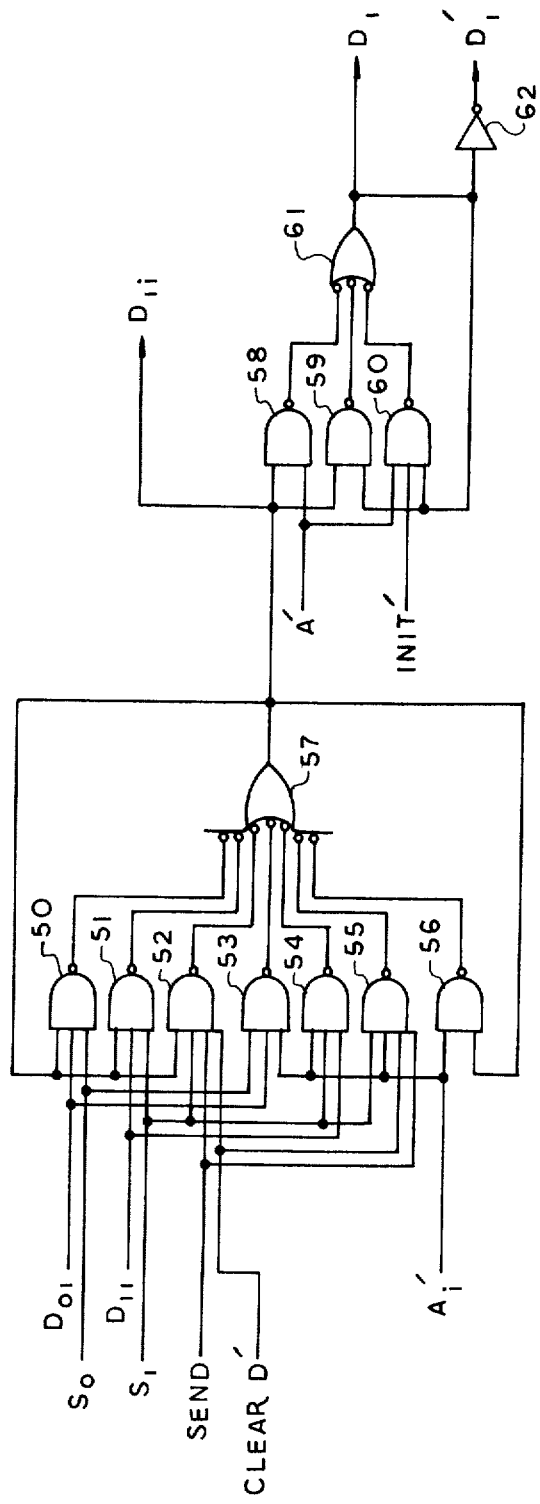

FIG. 9 shows the one circuit of the queue. It operates analogously to the zero circuit of FIG. 8 transmitting signals on $D_{01}$ or $D_{11}$ according to whether $S_0$ or $S_1$ is set and inserting a one character after the first E of a transmission if $S_1$ is one.

Figure 10:
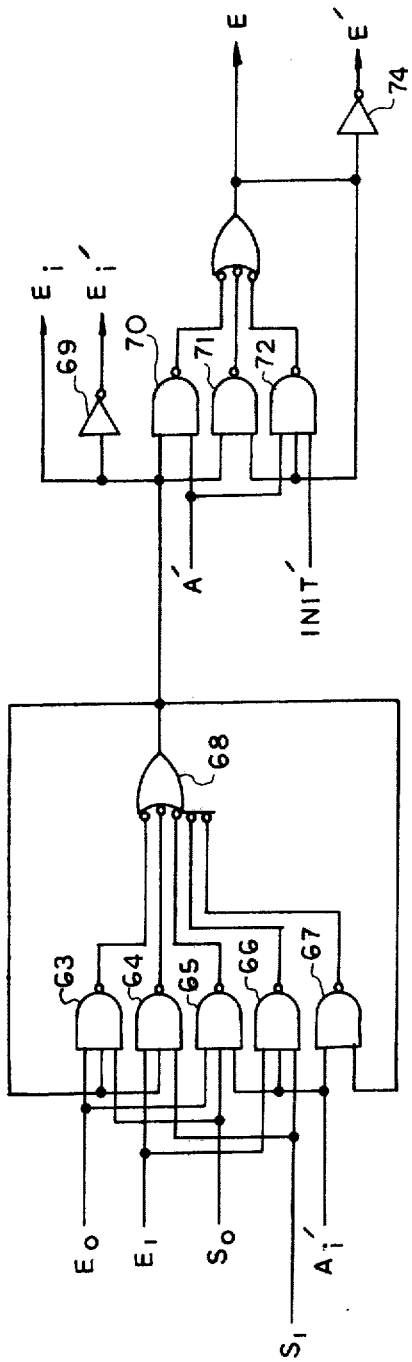

FIG. 10 shows the E circuit of the queue. It operates analogously to the zero circuit of FIG. 8 and the one circuit of FIG. 9 except that no character is inserted through the E circuit.

Figure 11:
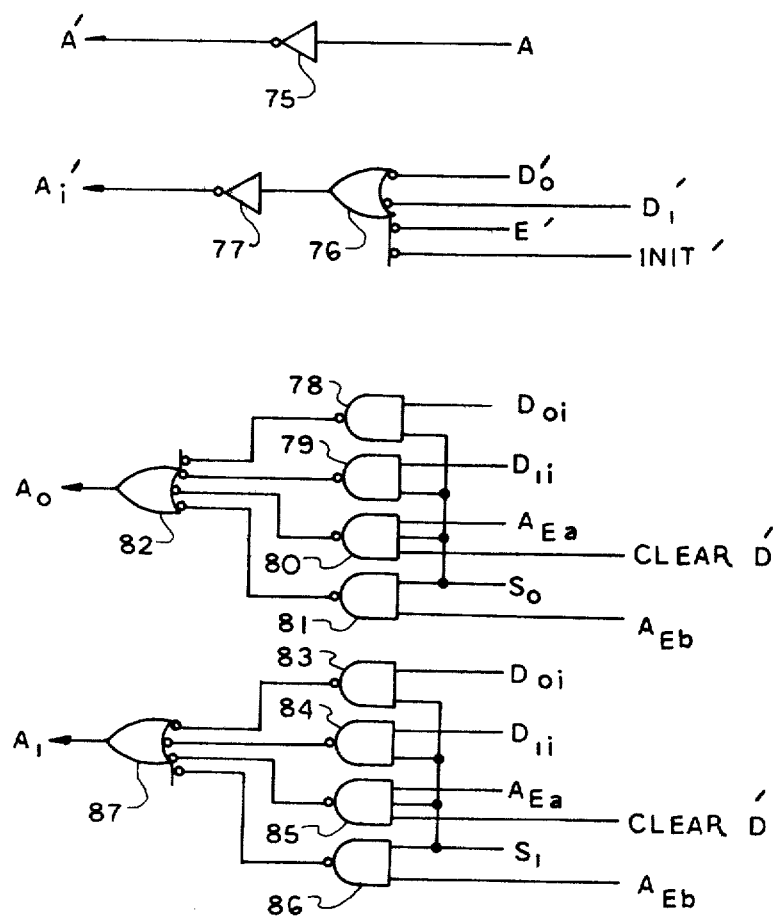

The acknowledge circuits for the queue are shown in FIG. 11. Arbiter input A on the output path is inverted to obtain A' for the output cell of the queue. Signals $D_0'$, $D_1'$, and E' from the output cell are used to determine $A_i'$ which is used to indicate to the input cell presence of data in the output cell. Acknowledge $A_0$ for the zero input path is generated from $D_{0i}$, $D_{li}$, $A_{Ea}$, and $A_{Eb}$ if $S_0$ is one. Acknowledge $A_1$ for the one input path is generated from the same signals if $S_1$ is one. $D_{0j}$ and $D_{li}$ indicate presence of a zero or a one in the queue input cell, and $A_{Ea}$ and $A_{Eb}$ indicate presence of an E and are generated by the End circuit.

Figure 12:
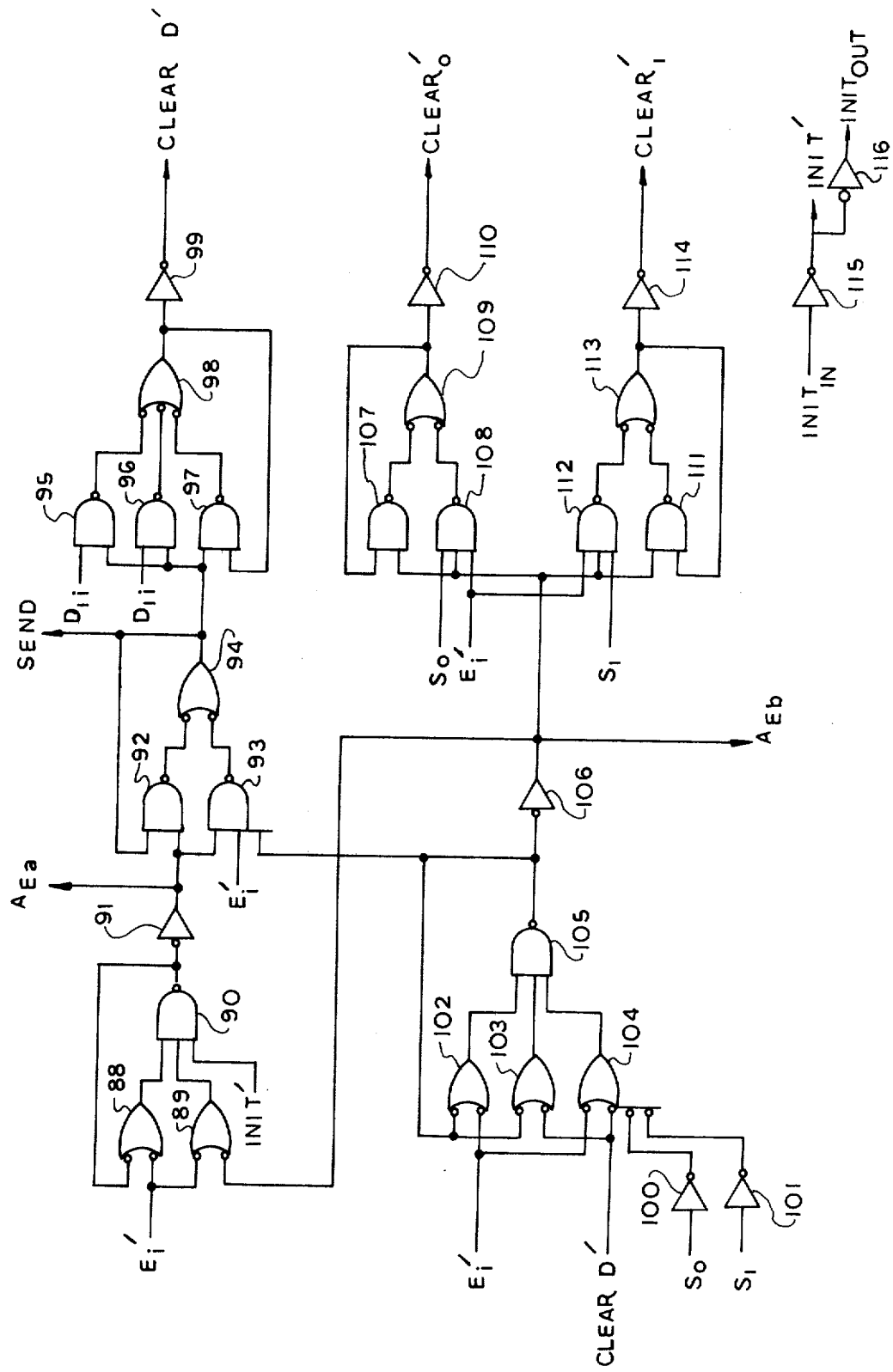

End circuit 13 of FIG. 5 is shown in detail in FIG. 12. The end circuit causes a zero or one character to be inserted into a transmission after the first E and causes clearing of the arbiter after the second E of a transmission Initially, $A_{Ea}$, $A_{Eb}$, Send, $S_0$, and $S_1$ are zero, and $E_i'$, Clear D', Clear$_0'$, and Clear$_1'$ are one. $S_0$ or $S_1$ will change to one when a request is made on an input path. When the first E of a transmission is received, $E_i'$ will change to zero causing C-element 88–90 to change to zero and $A_{Ea}$ to one acknowledging the E. When $E_i'$ returns to one, Send will become one causing a zero or one character to be inserted into the transmission. When the character has been inserted $D_{0i}$ or $D_{1i}$ will change to one, C-element 95–98 will change to one, and Clear D' will change to zero to clear the inserted character from the input cell of the queue and block the acknowledge $A_{Ea}$. When the second E is encountered, $E_i'$ will change to zero again causing C-element 102–105 to change to zero and $A_{Eb}$ to change to one to acknowledge the E. When $E_i'$ returns to one, either Clear$_0'$ or Clear$_1'$ will change to zero depending upon whether $S_0$ or $S_1$ is one. This will cause the request and arbitration circuits to clear to the state where both $S_0$ and $S_1$ are zero. C-element 88–90 will also return to one. $A_{Ea}$ will return to zero, Send will return to zero, and Clear D' will return to one. When $S_0$ and $S_1$ are both zero and Clear D' is one, C-element 102–105 will return to one with $A_{Eb}$ becoming zero and causing Clear$_0'$ or Clear$_1'$, whichever was zero, to return to one and allow the next request through. The circuit is then in its initial state again.

Initialization of the arbiter switch is accomplished by setting the Init$_{in}$ signal to one for a sufficient period of time and then changing it to zero for normal operation. Init$_{in}$ is buffered to produce Init$_{out}$.

EPILOGUE

As described above, the present invention is a speed independent arbitration switch employing four-wire communication paths for pipelined message transmission through digital communication networks.

While but one embodiment of the present invention has been disclosed, it will be obvious to those skilled in the art that variations and modifications may be made therein without departing from the spirit of the scope of the invention as claimed.

What is claimed is:

1. An arbitration switch for receiving sequential sets of data signals from two different nodes of a digital communication network and transmitting those signals to a third node, said sets including a first set of data signals, each set of data signals including an end signal, said switch comprising:
   queue means coupled to receive the respective sets of data signals from each of said two nodes;
   an arbitration circuit coupled to said respective nodes to receive said respective sequential sets of data signals and to signal said queue means to select the first set of the data signals to be received for subsequent transmission to said third node; and
   end circuit means to detect the end signal of the first set of data signals and clear the switch for subsequent reception of another set of data signals.

2. The arbitration switch according to claim 1 further including:
   a request circuit coupled to said incoming nodes and responsive to the arrival of data signals to request the arbitration circuit to set the switch circuit to receive that data first received.

3. An arbitration switch according to claim 2 wherein:
   said queue means includes a first cell as a receiving cell and a second cell to form a two cell queue, said second cell receiving data signals from said receiving cell for transmission to said third node.

4. An arbitration switch according to claim 3, wherein:
   said second cell of said two cell queue receives a data bit from the first cell only when the second cell is empty.

5. An arbitration switch according to claim 4 wherein said end circuit includes:
   address means coupled to said switch to add an address signal to the end of the data signals to indicate which of said nodes was selected for transmission.

6. An arbitration switch for receiving sequential sets of data signals from two different nodes of a digital communication network and transmitting those signals to a third node, said sets including a first set of data signals, each set of data signals including an end signal, said switch comprising:
   input queue means coupled to receive the respective data signals from each of said two nodes;
   an arbitration circuit coupled to said respective nodes to receive said respective sequential sets of data signals and to signal said queue means to select the first set of data signals to be received for subsequent transmission to said third node;
   address circuit means coupled to said switch to add an address signal to the end of the data signals to indicate which of said nodes was selected for transmission; and
   end circuit means to detect the end signal of the first set of data signals and clear the switch for subsequent reception of another set of data signals.

7. The arbitration switch according to claim 6 further including:
   a request circuit coupled to said incoming nodes and responsive to the arrival of data signals to request the arbitration circuit to set the queue to receive that data first received.

* * * * *